(12) United States Patent  
DeRenzis et al.

(10) Patent No.: US 8,997,999 B1
(45) Date of Patent: Apr. 7, 2015

(54) ROTATING PRESSURE WASHING STAND FOR SPA OR POOL FILTER

(71) Applicants: Robert DeRenzis, New City, NY (US); Sharon DeRenzis, New City, NY (US)

(72) Inventors: Robert DeRenzis, New City, NY (US); Sharon DeRenzis, New City, NY (US)

(*) Notice: Subject to any disclaimer, the term of this patent is extended or adjusted under 35 U.S.C. 154(b) by 358 days.

(21) Appl. No.: 13/652,265

(22) Filed: Oct. 15, 2012

(51) Int. Cl.
 *B01D 29/66* (2006.01)
 *B08B 3/02* (2006.01)
 *B01D 29/74* (2006.01)

(52) U.S. Cl.
 CPC ............... *B01D 29/66* (2013.01); *B01D 29/74* (2013.01)

(58) Field of Classification Search
 None
 See application file for complete search history.

(56) References Cited

U.S. PATENT DOCUMENTS

| | | | |
|---|---|---|---|
| 3,650,283 A | 3/1972 | Lang | |
| 5,330,065 A | 7/1994 | Bradley | |
| 5,384,045 A | 1/1995 | Chmielewski et al. | |
| 6,152,155 A | 11/2000 | Milligan | |
| 2006/0243309 A1* | 11/2006 | Prescott et al. | 134/33 |

* cited by examiner

*Primary Examiner* — Thomas M Lithgow
(74) *Attorney, Agent, or Firm* — Crossley Patent Law

(57) ABSTRACT

A rotating pressure washing stand for spa or pool filter that includes an open-topped cylindrical housing having a vertical rod centrally disposed therein, a buoyant base disc insertable around said rod, said buoyant base disc configured to releasably support an extant pool or spa filter thereon, wherein water pressurized through a pressure washer is forcibly ejected from a plurality of nozzles disposed in a spiral around the housing into the interior of the housing, said plurality of nozzles including a lowermost nozzle oriented to directionally jet water and rotationally engage a plurality of fin members disposed on a bottom surface of the base disc, whereby a filter is rotated and cleaned inside the housing without a user having to scrub the filter or bend over so to do.

8 Claims, 5 Drawing Sheets

ROTATING PRESSURE WASHING STAND FOR SPA OR POOL FILTER

BACKGROUND OF THE INVENTION

Various types of washing stands for spa or pool filters are known in the prior art. However, what is needed is a rotating pressure washing stand for spa or pool filter that includes an open-topped cylindrical housing having a vertical rod centrally disposed therein, a buoyant base disc insertable around said rod, said buoyant base disc configured to releasably support an extant pool or spa filter thereon, wherein water pressurized through a pressure washer is forcibly ejected from a plurality of nozzles disposed in a spiral around the housing into the interior of the housing, said plurality of nozzles including a lowermost nozzle oriented to directionally jet water and rotationally engage a plurality of fin members disposed on a bottom surface of the base disc, whereby a filter is rotated and cleaned inside the housing without a user having to scrub the filter or bend over so to do.

FIELD OF THE INVENTION

The present invention relates to a rotating pressure washing stand for spa or pool filter, and more particularly, to a rotating pressure washing stand for spa or pool filter that includes an open-topped cylindrical housing having a vertical rod centrally disposed therein, a buoyant base disc insertable around said rod, said buoyant base disc configured to releasably support an extant pool or spa filter thereon, wherein water pressurized through a pressure washer is forcibly ejected from a plurality of nozzles disposed in a spiral around the housing into the interior of the housing, said plurality of nozzles including a lowermost nozzle oriented to directionally jet water and rotationally engage a plurality of fin members disposed on a bottom surface of the base disc, whereby a filter is rotated and cleaned inside the housing without a user having to scrub the filter or bend over so to do.

SUMMARY OF THE INVENTION

The general purpose of the rotating pressure washing stand for spa or pool filter, described subsequently in greater detail, is to provide a rotating pressure washing stand for spa or pool filter which has many novel features that result in a rotating pressure washing stand for spa or pool filter which is not anticipated, rendered obvious, suggested, or even implied by prior art, either alone or in combination thereof.

The present invention enables an expedient means for cleaning and washing a pool or spa filter without the need of bending over and scrubbing said filter. The filter is simply removed from its in situ housing in any spa or pool, placed upon a buoyant base disc and then removably inserted around a vertical rod centrally disposed within an open-topped cylindrical housing. A hinged lid is moved to a closed position and a filter handle is releasably interconnected with the rod to stabilize the filter from unwanted upward movement when water is forcibly introduced into the housing.

A hose is disposed exteriorly upon the housing, said hose wound in a spiral thereabouts between a lowest point and a highest point. A plurality of holes are disposed within the housing, each of said holes configured to sealingly receive each of a plurality of nozzles therein. Each of said plurality of nozzles is disposed upon the hose, each of the plurality of nozzles oriented upon the housing directed in-facing along a radius of said housing. Thusly, when water is forced through the hose, water is forcibly ejected through each of the plurality of nozzles, and sprayed along a radius of the housing towards the vertical rod centrally disposed upwardly within the housing.

A lowermost nozzle, disposed at the lowest point, is oriented angularly with respect to a radius of the housing, whereby water is directed off center into the housing. The lowermost nozzle is configured to spray a jet of water angularly within the housing, to rotationally engage the base disc disposed therein. The base disc includes a plurality of fin members disposed upon a bottom surface of the base disc. When the base disc is removably inserted into the housing, each of the fin members is disposed in a plane within the line of sight of the lowermost nozzle, whereby water forcibly ejected from the lowermost nozzle is forced to engage with each of the fin members and the base disc (and a pool or spa filter disposed thereupon) is caused to spin.

A connection hose is disposed in open communication with the hose, said connection hose configured to interconnect with a pressure washer. Thusly, water pressurized and forcibly ejected by means of the pressure washer is conveyed through the connection hose, into the hose, and forcibly ejected through each of the plurality of nozzles into the interior of the housing. A filter placed for cleaning within the housing is thereby caused to rotate about the vertical rod as water is forcibly directed to the filter.

The housing includes a drain disposed proximal to a base of the housing whereby fluids collected inside the housing during cleaning may be readily drained therefrom. A plurality of leg members is disposed upon the housing to raise the housing off of any underlying surface upon which the device is placed. A holster is disposed exteriorly upon the housing to releasably support and house a pressure washer proximal to the housing for use, as desired.

Thus has been broadly outlined the more important features of the present rotating pressure washing stand for spa or pool filter so that the detailed description thereof that follows may be better understood and in order that the present contribution to the art may be better appreciated.

Objects of the present rotating pressure washing stand for spa or pool filter, along with various novel features that characterize the invention are particularly pointed out in the claims forming a part of this disclosure. For better understanding of the rotating pressure washing stand for spa or pool filter, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
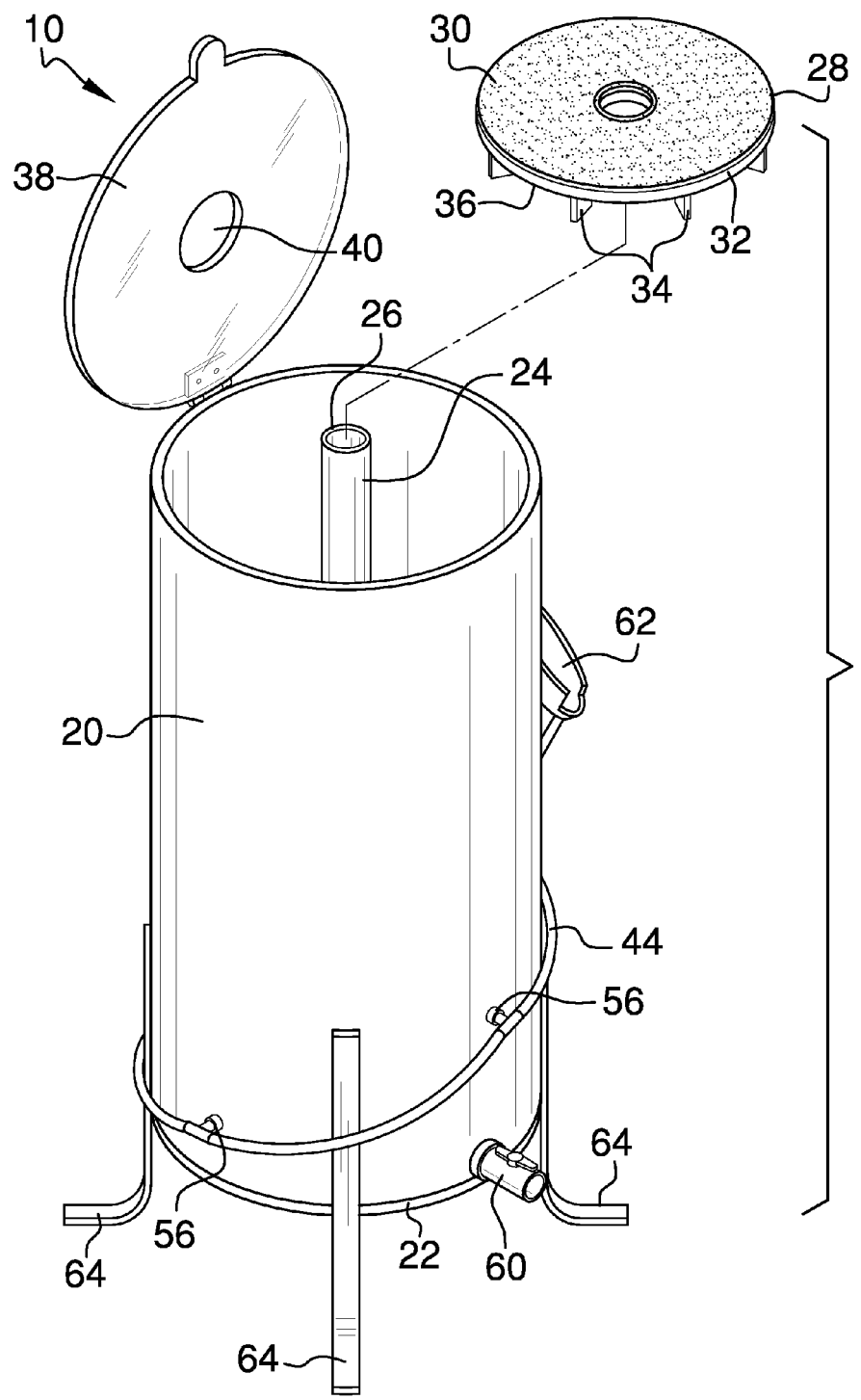
FIG. 1 is a side elevation view.
Figure 2:
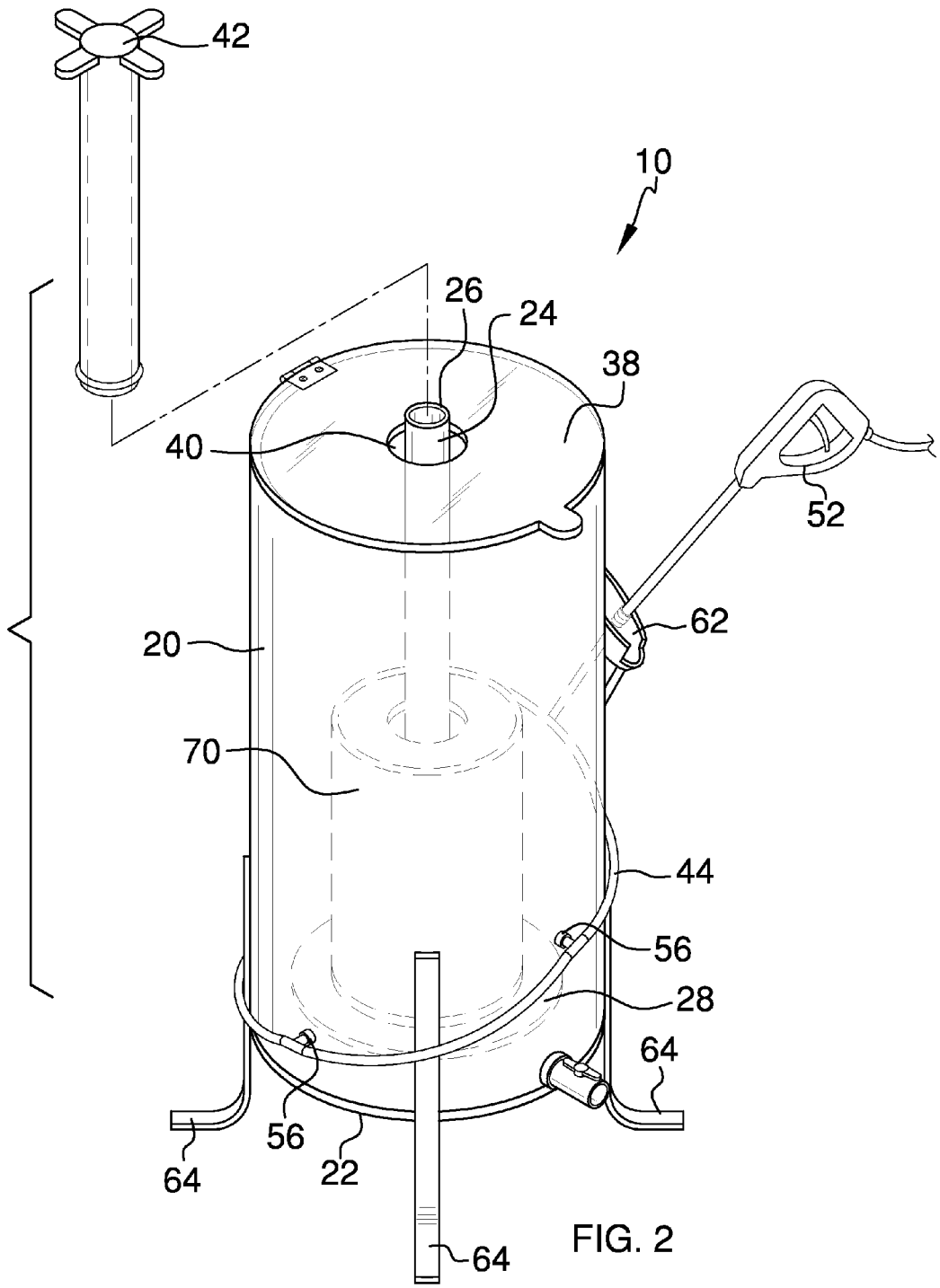
FIG. 2 is an isometric view.
Figure 3:
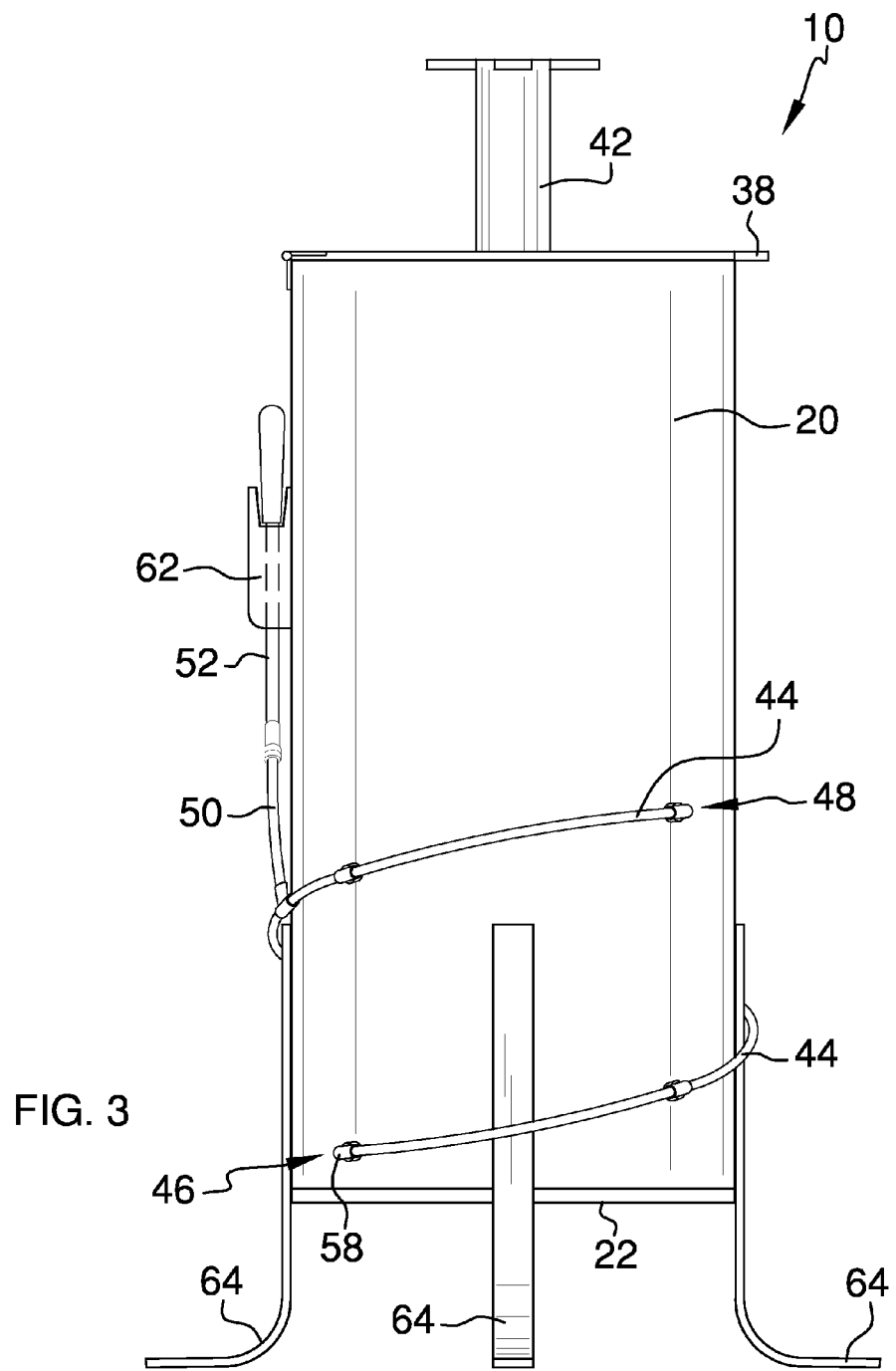
FIG. 3 is a side view.
Figure 4:
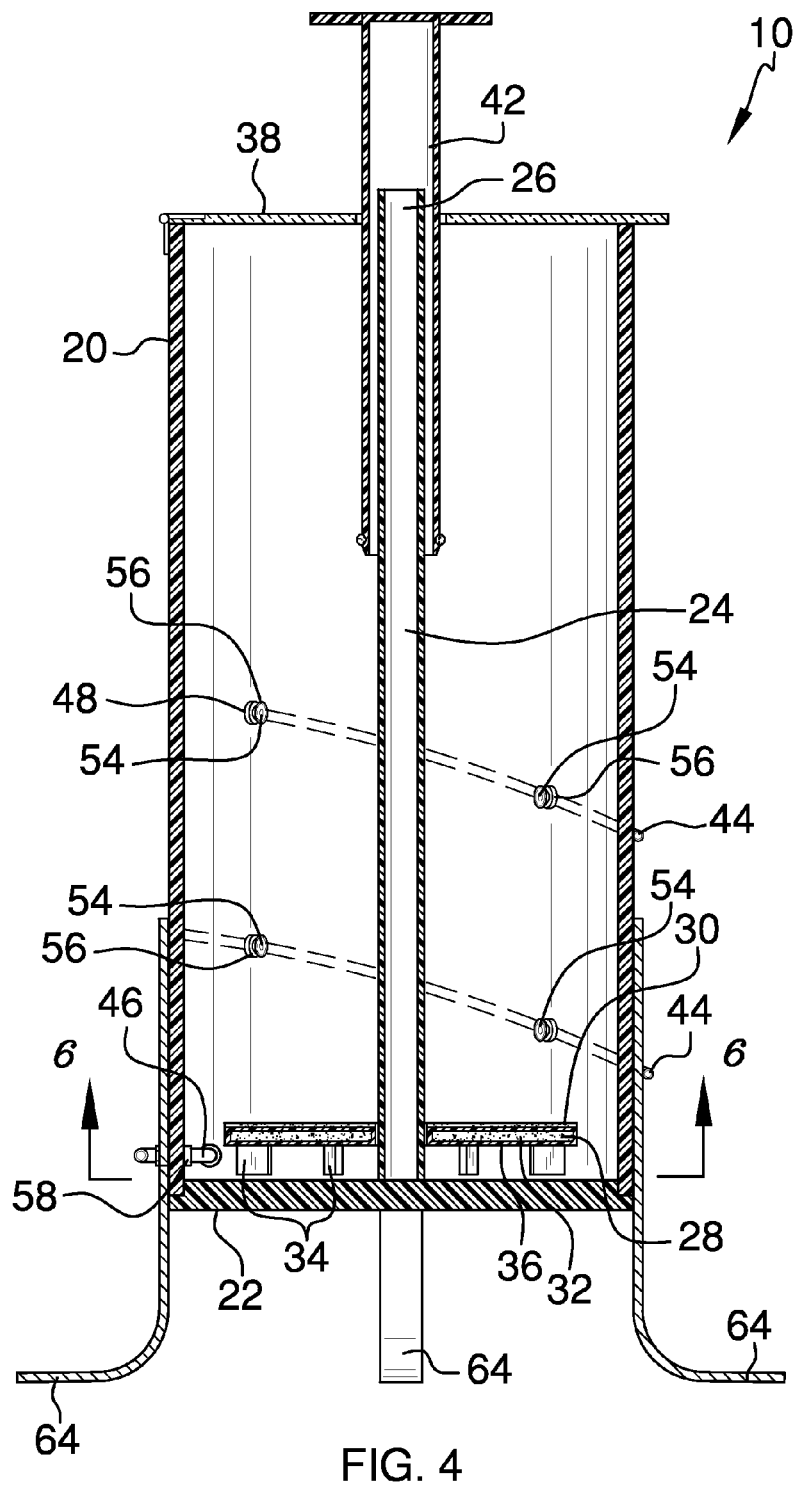
FIG. 4 is a longitudinal cross-section view.
Figure 5:
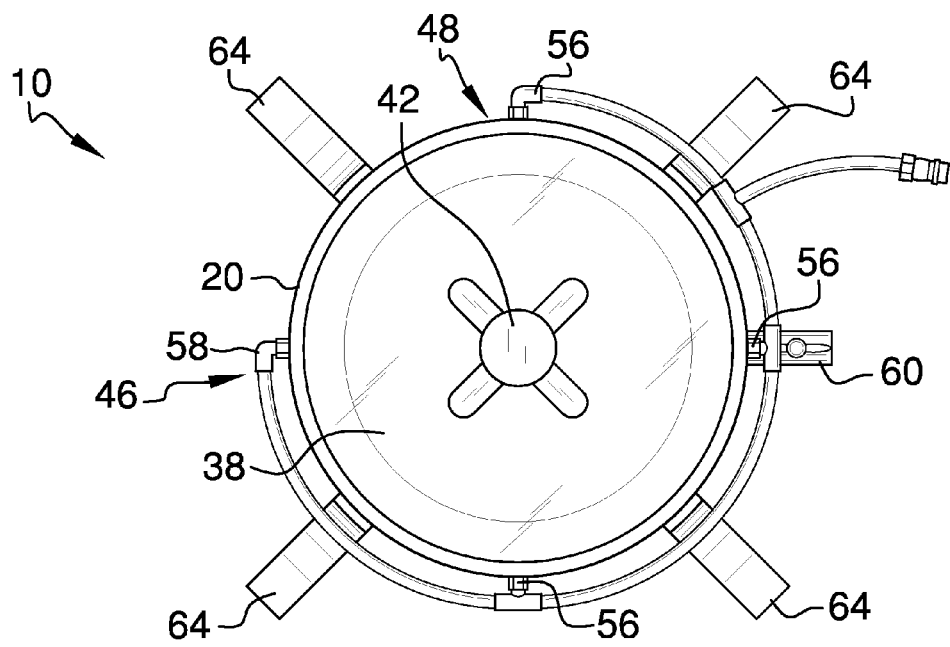
FIG. 5 is a top view.
Figure 6:
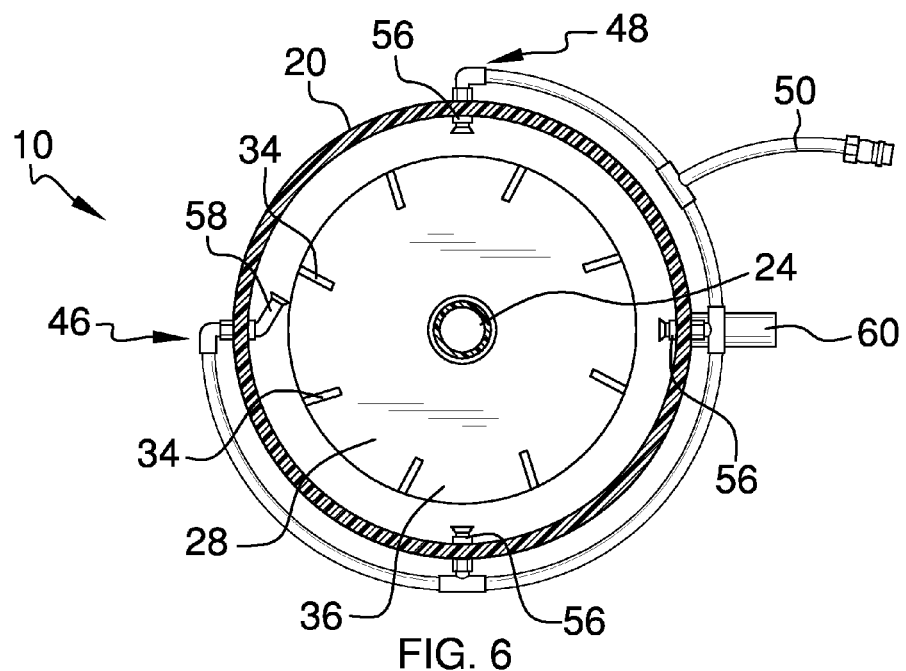
FIG. 6 is a cross-section view taken along the line 6-6 of FIG. 4.

With reference now to the drawings, and in particular FIGS. 1 through 6 thereof, example of the instant rotating pressure washing stand for spa or pool filter employing the principles and concepts of the present rotating pressure washing stand for spa or pool filter and generally designated by the reference number 10 will be described.

Referring to FIGS. 1 through 6 a preferred embodiment of the present rotating pressure washing stand for spa or pool filter 10 is illustrated.

The rotating pressure washing stand for spa or pool filter 10 has been devised to enable expedient cleaning of an extant pool or spa filter 70 without a user having to bend over or scrub said filter 70. The filter 70 is removed from the pool or spa filter housing and subsequently placed upon a buoyant base disc 28 to be inserted around a vertical rod 24 centrally disposed within an open-topped cylindrical housing 20. A pressure washer 52 is then interconnected with a connection hose 50 and water is forcibly ejected into the housing 20 through a hose 44 wound in a spiral between a lowest point 46 proximal a base 22 of the housing 20, and a highest point 48 set to accommodate a filter 70. The force of the water sprayed interiorly into the housing 20 causes rotation of the base disc 28, in the manner subsequently described in this specification, and the pool or spa filter 70 is rotated and cleansed by the forcibly ejected water directed within the housing 20.

The rotating pressure washing stand for spa or pool filter 10, therefore, includes an open-topped cylindrical housing 20 having a base 22. A vertical rod 24 is disposed within the housing 20, said vertical rod 24 centrally disposed upwards from the base 22 of the housing 20. A top end 26 is disposed atop the vertical rod 24. A buoyant base disc 28, configured to releasably insert over the vertical rod 24, includes a circular rubberlike pad 30, a floating disc 32 disposed underlying the rubberlike pad 30, and a plurality of fin members 34 disposed radially upon a bottom surface 36 of the floating disc 32.

A transparent hinged lid 38 is disposed to releasably enclose the housing 20. An aperture 40 is centrally disposed in the lid 38. Said aperture 40 is configured to overlie the top end 26 of the vertical rod 24 and a filter handle 42 is releasably insertable into the aperture 40 to releasably engage with the vertical rod 24. The filter handle 42 releasably engages with a filter 70 disposed atop the base disc 28 and prevents unwanted upward movement of the filter 70 when water is forcibly introduced into the housing 20. A hose 44 is disposed exteriorly upon the housing 20, said hose 44 spiraling around the housing 20 from a lowest point 46 proximal the housing base 22 to a highest point 48. A connection hose 50 is disposed upon the hose 44, said connection hose 50 interconnectable with a pressure washer 52.

A plurality of holes 54 is disposed in the housing 20 and a plurality of nozzles 56 is disposed upon the hose 44, each of said nozzles 56 disposed plugging each of the plurality of holes 54. A lowermost nozzle 58, disposed at the lowest point 46 is directionally oriented to engage a jet of water sprayed therefrom with each of the plurality of fin members 34 disposed on the bottom surface 36 of the buoyant base disc 28. When water is forcibly ejected from the pressure washer 52, said water is conveyed through the hose 44 and sprayed through each of the plurality of nozzles 56. The lowermost nozzle 58 is directionally oriented angularly with respect to the circumference of the housing 20. The base disc 28, when releasably inserted over the rod 24 into the housing 20, rests proximal the base 22 of the housing 20. The lowermost nozzle 58 is oriented to engagingly spray a jet of water to forcibly engage with each of the fin members 34 disposed on the bottom surface 36 of the floating disc 32 and the base disc 28 (and thusly a filter 70 disposed atop the base disc) is caused to spin thereby, rotating around the vertical rod 24. Each of the plurality of nozzles 56, with the exception of the lowermost nozzle 58, is oriented in-facing along a radius of the housing 20, and water forcibly ejected therefrom is sprayed along a corresponding radius to engage with a filter 70 disposed within the housing 20.

A drain 60 is disposed upon the housing 20 proximal the housing base 22. The housing 20 is readily drained of water collected within the housing 20 by means of the drain 60. To conveniently locate the pressure washer 52 proximal the housing 20 between uses, and even during use (if desired), a holster 62 is disposed exteriorly upon the housing 20, said holster 62 configured to releasably house the pressure washer 52 thereat. A plurality of leg members 64 is disposed upon the housing 20 whereby the base 22 of said housing 20 is elevated above an underlying surface. Pressurized fluids ejected from the pressure washer 52 are communicated to the interior of the housing 20 whereby an extant filter 70 from a swimming pool or spa is rotatable and cleanable within the housing 20.

What is claimed is:

1. A rotating pressure washing stand for spa or pool filter comprising:
   an open-topped cylindrical housing;
   a vertical rod centrally disposed within the housing, said vertical rod including a top end;
   a buoyant base disc configured to releasably insert over the vertical rod, said buoyant base disc comprising:
     a plurality of fin members disposed radially upon a bottom surface of the floating disc;
   a hinged lid disposed to releasably enclose the cylinder;
   an aperture centrally disposed in the lid, said aperture overlying the top end of the vertical rod;
   a filter handle releasably insertable into the aperture, said handle releasably engagable with the vertical rod;
   a hose disposed exteriorly upon the housing, said hose interconnectable with a water source;
   a plurality of holes disposed in the housing; and
   a plurality of nozzles disposed upon the hose, each of said nozzles disposed plugging each of the plurality of holes;
   wherein fluids ejected from the water source are communicated to the interior of the housing whereby an extant filter from a swimming pool or spa is rotatable and cleanable within the housing.

2. The rotating pressure washing stand for spa or pool filter of claim 1 wherein the lowest point of the hose is disposed proximal the base of the cylindrical housing whereby a lowermost nozzle disposed thereat is directionally oriented to spray a jet of pressurized fluid, when the device is interconnected with a pressure washer, to rotationally engage the buoyant base disc by spray impact with each of the plurality of fin members disposed on the bottom surface of the floating disc whereby an extant pool or spa filter disposed atop the rubberlike pad is caused to spin around the vertical rod within the housing.

3. The rotating pressure washing stand for spa or pool filter of claim 2 wherein the hose is interconnectable with a pressure washer by means of a connection hose disposed upon the hose.

4. The rotating pressure washing stand for spa or pool filter of claim 3 wherein the housing further includes a drain whereby the housing interior is drainable therethrough.

5. The rotating pressure washing stand for spa or pool filter of claim 4 wherein the housing further comprises a holster disposed exteriorly upon the housing, said holster configured to releasably receive and house a pressure washer thereat.

6. The rotating pressure washing stand for spa or pool filter of claim 5 further comprising a plurality of leg members disposed upon the cylindrical housing wherein the housing is elevated from the ground.

7. The rotating pressure washing stand for spa or pool filter of claim 6 wherein the lid is transparent.

8. A rotating pressure washing stand for spa or pool filter comprising:

an open-topped cylindrical housing having a base;
a vertical rod centrally disposed within the housing, said vertical rod centrally disposed upwards from the base;
a top end disposed atop the vertical rod;
a buoyant base disc configured to releasably insert over the vertical rod, said buoyant base disc comprising:
 a circular rubberlike pad;
 a floating disc disposed underlying the rubberlike pad;
 a plurality of fin members disposed radially upon a bottom surface of the floating disc;
a transparent hinged lid disposed to releasably enclose the cylinder;
an aperture centrally disposed in the lid, said aperture configured overlying the top end of the vertical rod;
a filter handle releasably insertable into the aperture, said handle releasably engagable with the vertical rod;
a hose disposed exteriorly upon the housing, said hose spiraling around the housing from a lowest point proximal the housing base to a highest point;
a connection hose disposed upon the hose, said connection hose interconnectable with a pressure washer;
a plurality of holes disposed in the housing;
a plurality of nozzles disposed upon the hose, each of said nozzles disposed plugging each of the plurality of holes, wherein a lowermost nozzle is directionally oriented to rotationally engage a jet of water sprayed therefrom with each of the plurality of fin members disposed on the bottom surface of the buoyant base disc;
a drain disposed upon the housing proximal the housing base;
a holster disposed exteriorly upon the housing, said holster configured to releasably house a pressure washer thereat; and
a plurality of leg members disposed upon the housing whereby the base of said housing is elevated above an underlying surface;
wherein pressurized fluids ejected from the pressure washer are communicated to the interior of the housing whereby an extant filter from a swimming pool or spa is rotatable and cleanable within the housing.

* * * * *